United States Patent
Yu et al.

(10) Patent No.: US 12,055,515 B2
(45) Date of Patent: Aug. 6, 2024

(54) ELECTRIC FIELD VARIABLE GAS SENSOR INCLUDING GAS MOLECULE ADSORPTION INDUCING MATERIAL AND MANUFACTURING METHOD THEREOF

(71) Applicant: RESEARCH & BUSINESS FOUNDATION SUNGKYUNKWAN UNIVERSITY, Suwon-si (KR)

(72) Inventors: Woo Jong Yu, Suwon-si (KR); Young Rae Kim, Suwon-si (KR); Thanh Luan Phan, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 460 days.

(21) Appl. No.: 17/485,733

(22) Filed: Sep. 27, 2021

(65) Prior Publication Data
US 2022/0136995 A1    May 5, 2022

(30) Foreign Application Priority Data
Oct. 29, 2020    (KR) .................. 10-2020-0142343

(51) Int. Cl.
G01N 27/414    (2006.01)
(52) U.S. Cl.
CPC ................. *G01N 27/4141* (2013.01)
(58) Field of Classification Search
CPC .... B81B 2201/02–0292; G01N 27/129; G01N 27/4141; H01L 2924/13072–13076
See application file for complete search history.

(56) References Cited

U.S. PATENT DOCUMENTS

| 8,691,609 B1 * | 4/2014 | Smith ................. G01N 27/125 |
| | | 438/785 |
| 2011/0303953 A1 * | 12/2011 | Kamata ............. H01L 29/66969 |
| | | 257/253 |

(Continued)

FOREIGN PATENT DOCUMENTS

| KR | 10-2013-0086859 A | 8/2013 |
| KR | 10-1339114 B1 | 12/2013 |

(Continued)

OTHER PUBLICATIONS

Korean Office Action issued on Jun. 21, 2022, in counterpart Korean Patent Application No. 10-2020-0142343 (5 pages in Korean).

(Continued)

*Primary Examiner* — Fernando L Toledo
*Assistant Examiner* — Marshall Mu-Nuo Hatfield
(74) *Attorney, Agent, or Firm* — NSIP Law

(57) ABSTRACT

An electric field variable gas sensor includes a semiconductor substrate, an insulating film disposed on the semiconductor substrate, a semiconductor thin film material disposed on a part of the semiconductor substrate and a part of the insulating film, a gas molecule adsorption inducing material disposed on the semiconductor thin film material, a first electrode disposed on the semiconductor substrate to be spaced apart from the semiconductor thin film material, and a second electrode disposed on the insulating film to be connected with the semiconductor thin film material.

20 Claims, 7 Drawing Sheets

(56) References Cited

U.S. PATENT DOCUMENTS

| | | | |
|---|---|---|---|
| 2013/0062211 A1* | 3/2013 | Deshusses | G01N 27/127 977/773 |
| 2013/0115453 A1* | 5/2013 | Fan | H05K 1/0213 174/250 |
| 2017/0045473 A1* | 2/2017 | Yu | G01N 27/4141 |
| 2017/0067850 A1* | 3/2017 | Momose | C23C 14/16 |
| 2017/0216923 A1* | 8/2017 | Babenko | B22F 3/24 |
| 2019/0064106 A1* | 2/2019 | Nemirosky | G01N 27/4141 |
| 2019/0339227 A1* | 11/2019 | Drmosh | C23C 14/16 |
| 2020/0209187 A1* | 7/2020 | Chang | H01L 29/66969 |
| 2020/0300825 A1* | 9/2020 | Caicedo Panqueva | G01N 27/127 |

FOREIGN PATENT DOCUMENTS

| | | |
|---|---|---|
| KR | 10-2017-0004113 A | 1/2017 |
| KR | 10-2018-0126228 A | 11/2018 |

OTHER PUBLICATIONS

Korean Office Action issued on Feb. 15, 2022 in corresponding Korean Patent Application No. 10-2020-0142343 (5 pages in Korean).

* cited by examiner

[FIG. 1]
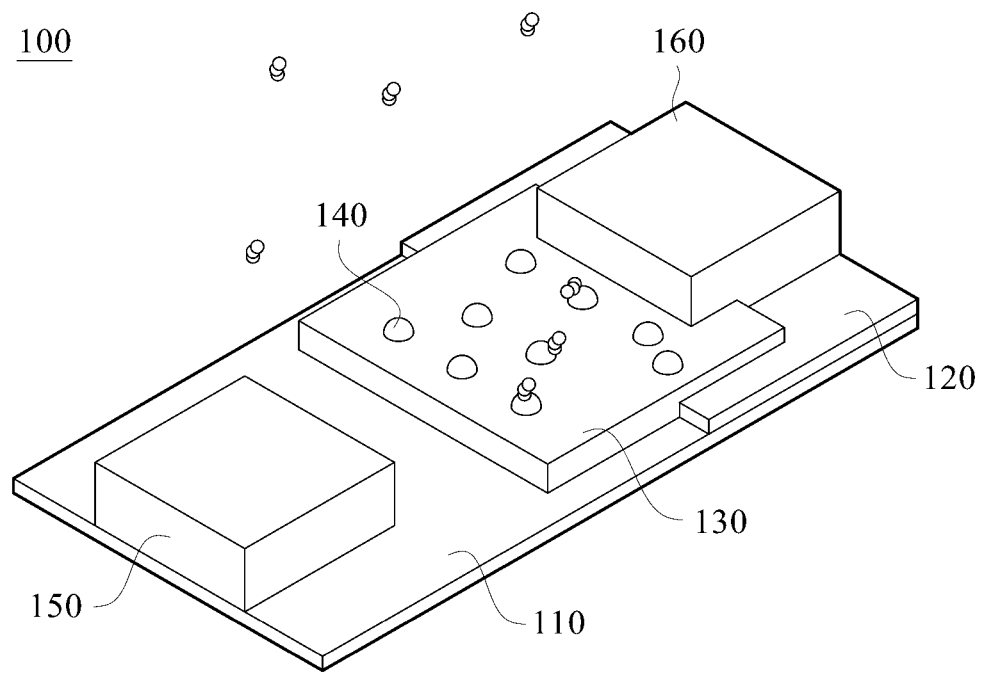
[FIG. 2]
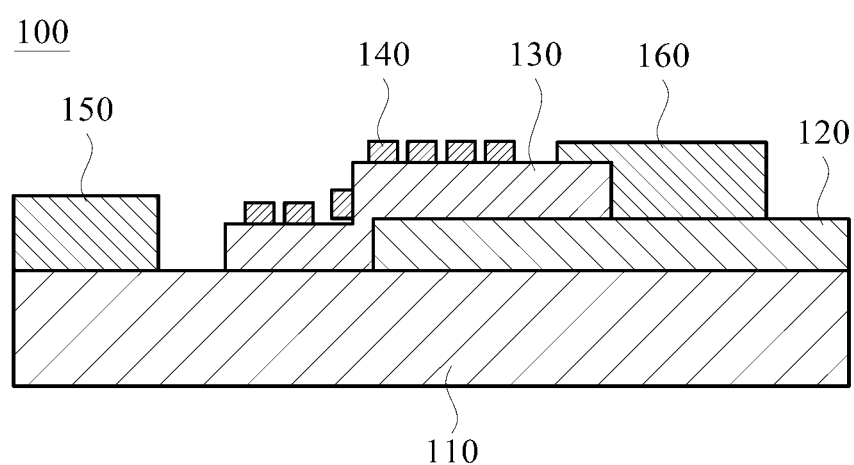

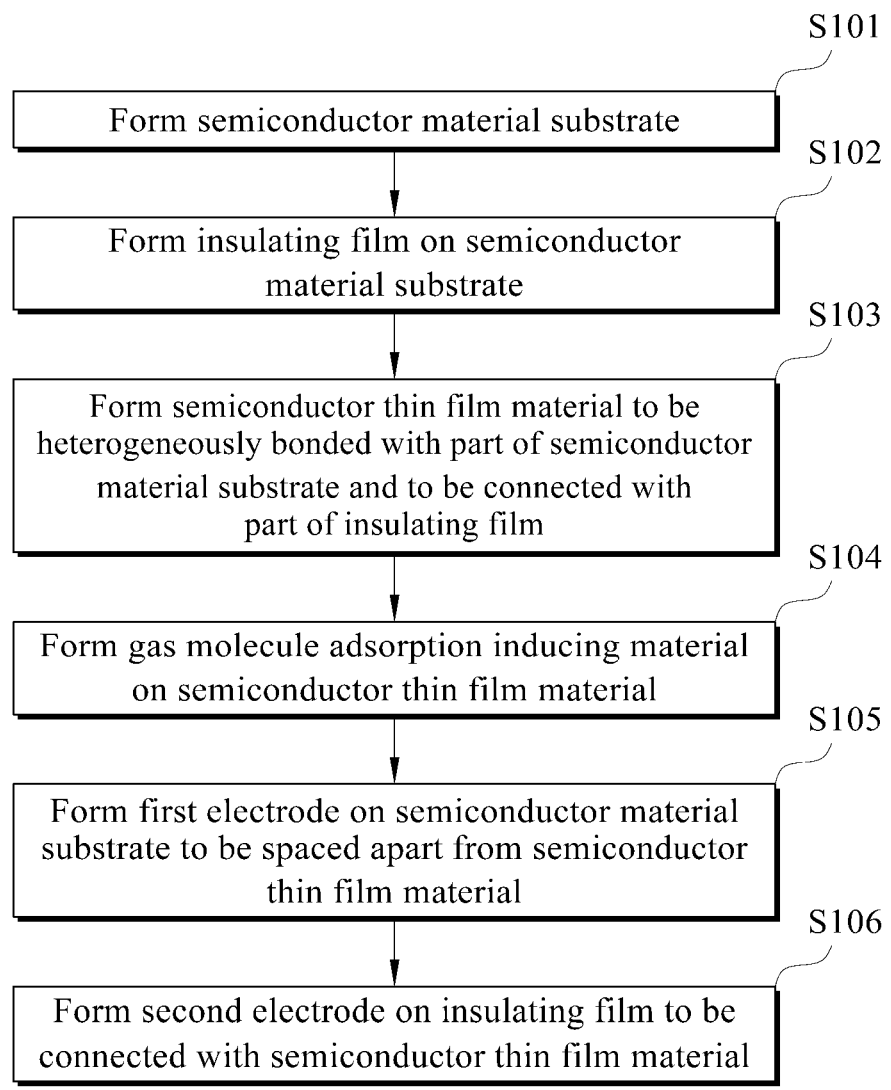

[FIG. 4]
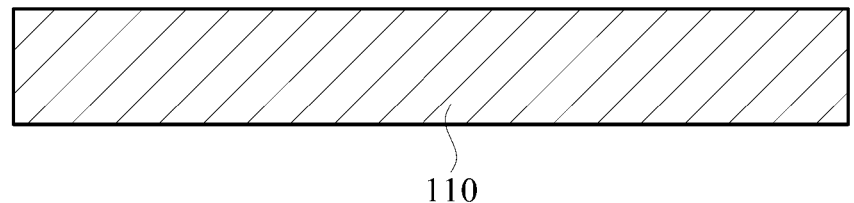
[FIG. 5]
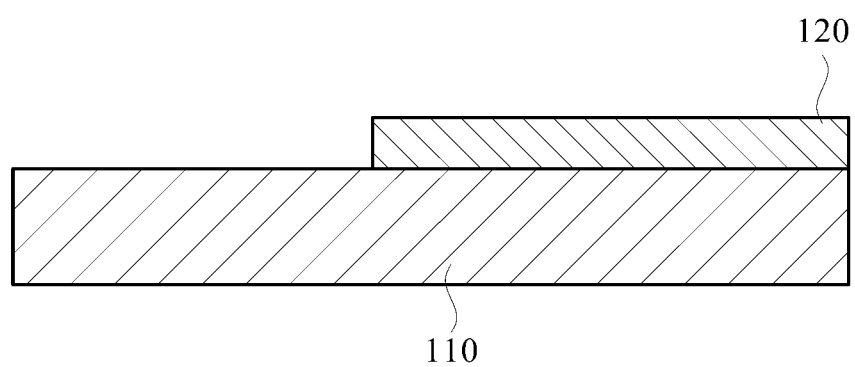
[FIG. 6]
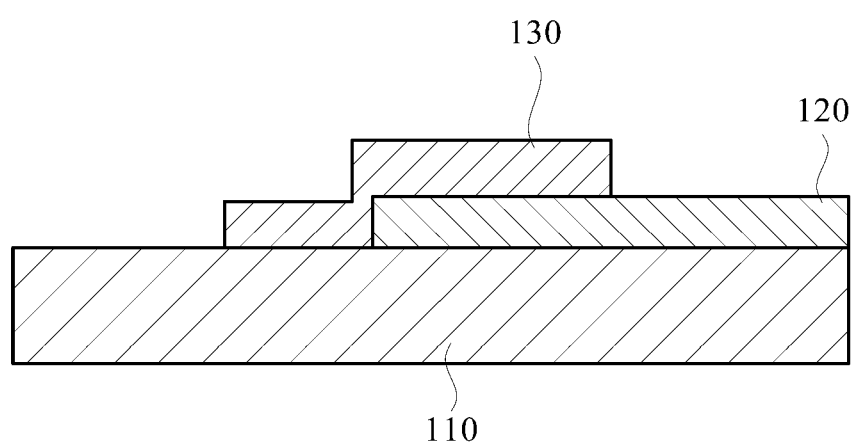

[FIG. 7]
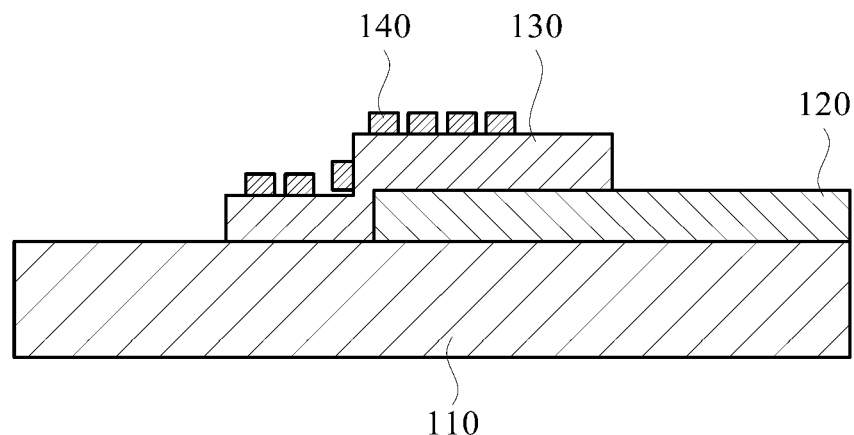
[FIG. 8]
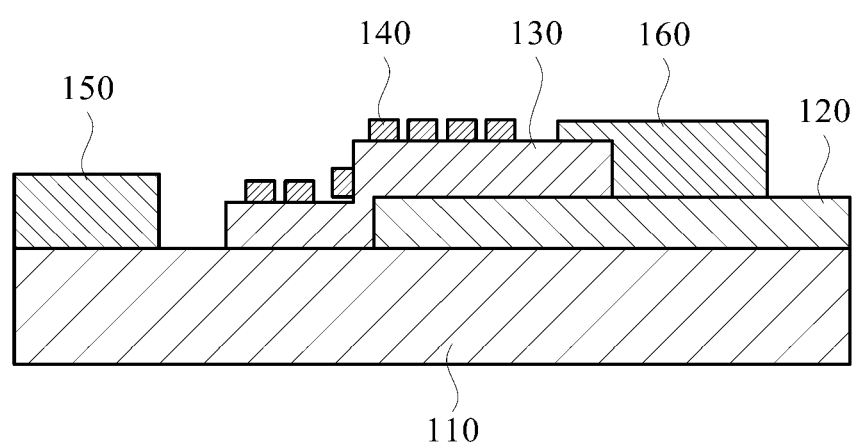

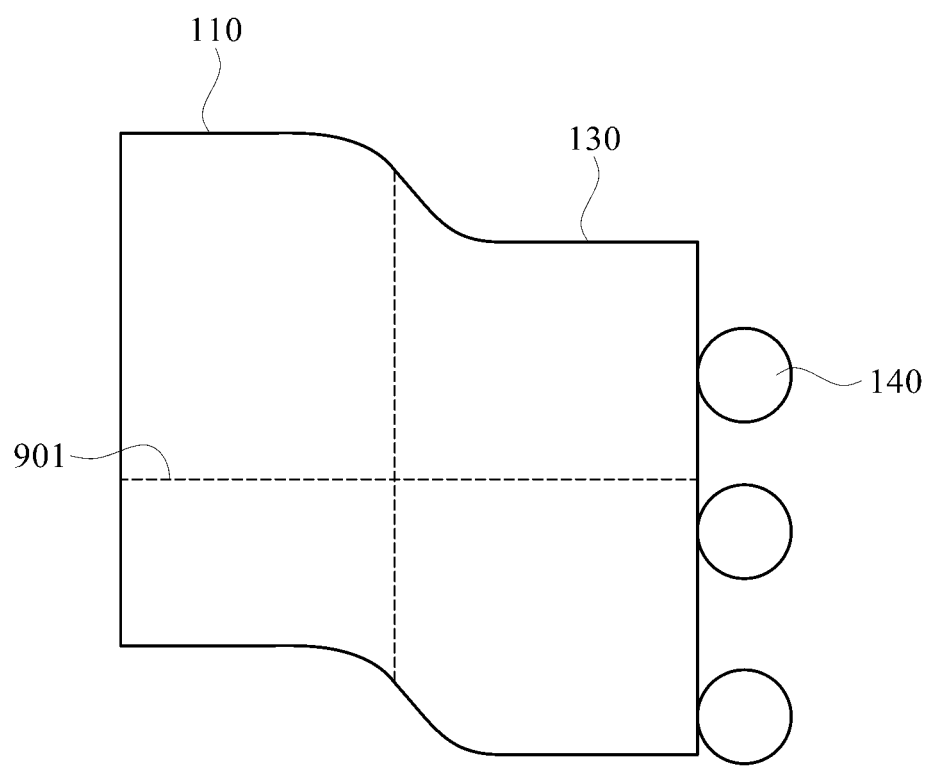
[FIG. 9]

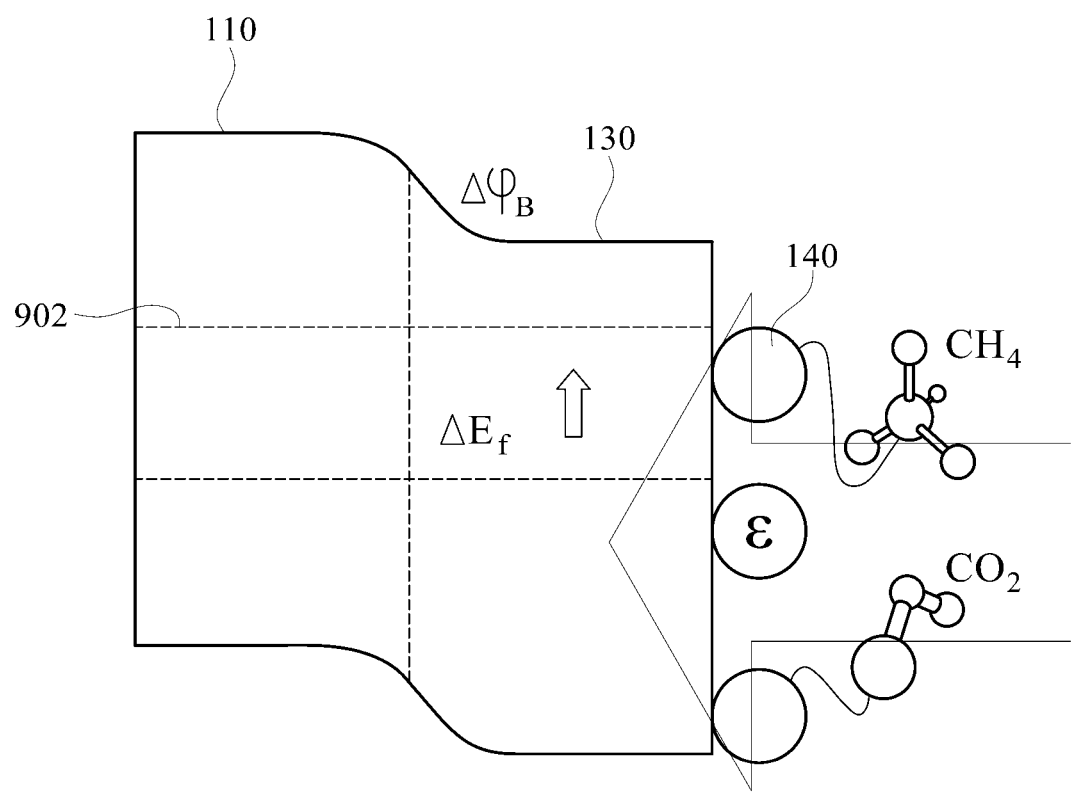

[FIG. 11]
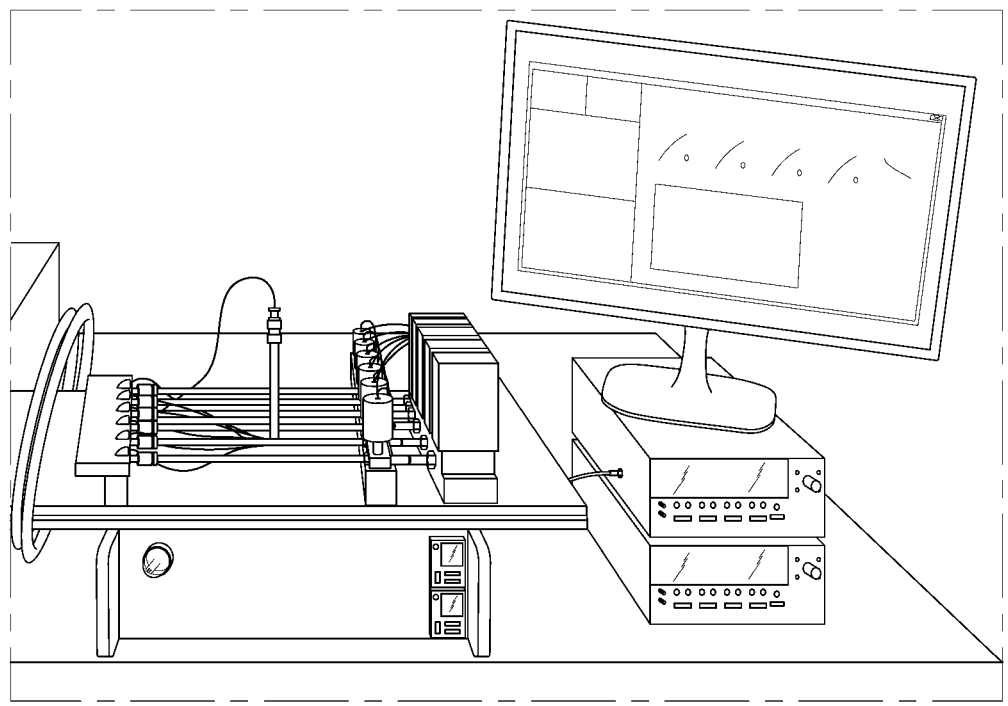

ELECTRIC FIELD VARIABLE GAS SENSOR INCLUDING GAS MOLECULE ADSORPTION INDUCING MATERIAL AND MANUFACTURING METHOD THEREOF

CROSS-REFERENCE TO RELATED APPLICATIONS

This application claims the benefit under 35 USC 119(a) of Korean Patent Application No. 10-2020-0142343 filed on Oct. 29, 2020, in the Korean Intellectual Property Office, the entire disclosure of which is incorporated herein by reference for all purposes.

BACKGROUND

1. Field

The present disclosure relates to an electric field variable gas sensor including a gas molecule adsorption inducing material and a manufacturing method thereof.

2. Description of the Related Art

According to the gas detection method, conventional gas sensors are classified into ion mobility, catalytic, semiconductor, and photoionization gas sensors.

First, ion mobility spectrometry (IMS) is a separating technique using the mobility characteristics for each ion according to gas surrounding the ions and an electric field to move gaseous ions in a uniform electric field under atmospheric pressure.

As a disadvantage of the IMS, since a radioactive material is used for ionization, the volume is relatively large, power consumption is high, and the price is high, so field applications are significantly limited.

Second, the catalytic gas sensor detects the presence or absence and concentration of gas by converting reaction heat with inflammable gas and oxygen to electrical signals. The catalytic gas sensor senses the gas concentration from a change in the resistance value of metal by heat generated during a catalytic reaction. In the case of metal, the resistance value is increased according to a rise in temperature.

As a disadvantage of the catalytic gas sensor, the catalytic gas sensor is stable in changes in ambient vapor or humidity, and temperature to be mainly used for an inflammable gas alarm, but it is difficult to detect gas at a high concentration.

Third, the photoionization (infrared) sensor measures the light absorption of gas molecules to convert the light absorption to a concentration, and representatively, a non-dispersive infrared (NDIR) method dominates the market. The NDIR method measures a gas concentration from reduction of electrical signals according to an infrared light adsorption degree in characteristic gas using an infrared bandpass filter that exists between an infrared light source and an infrared sensor.

As a disadvantage of the photoionization (infrared) sensor, although the volume tends to be decreased, it is a technical issue that the weight is reduced due to several components that include a light source. The photoionization (infrared) sensor is suitable for sampling and detecting suspected samples, but detection of an arbitrary area in the actual site is considerably limited.

Fourth, a colorimetric sensor kit has the principle of informing the presence or absence of gas through a color change when gas molecules and a chemical dye react with each other. Since the colorimetric sensor kit is intuitive and reacts very quickly, it is advantageous for targeting gas with high vapor pressure.

As a disadvantage of the colorimetric sensor kit, accurate identification is impossible in most of the gas characterized by low vapor pressure.

Fifth, the semiconductor gas sensor uses a change in electric conductivity when gas is in contact with a ceramic semiconductor surface. Gas molecules adsorbed in the semiconductor gas sensor apply an electric field to a semiconductor layer of the sensor to change the current amount flowing in the semiconductor layer and sense the gas. When specific gas is adsorbed in an oxide semiconductor, due to the movement of electrons, the thickness of a depletion layer on the surface of the oxide semiconductor varies, and a change in thickness of the depletion layer causes a change in the electric conductivity of the semiconductor. To enhance the sensitivity of the semiconductor gas sensor, the electric field of gas molecules efficiently needs to change the charge amount of the semiconductor layer by reducing the thickness of the semiconductor layer.

However, it is difficult to produce the thickness of the semiconductor layer to 30 nm or less due to a limitation of the current technology. Furthermore, as a disadvantage of the semiconductor gas sensor, in order to enhance a sensor resistance change due to the movement of trace electrons of an adsorption gas molecule, it is necessary to reduce the thickness of the semiconductor layer. Still, there is a limitation to reduce the thickness of a thin film semiconductor to 30 nm or less, and as a result, it is difficult to manufacture a high-sensitive sensor.

The semiconductor gas sensor is the most efficient sensor of the sensors described above because the configuration of the detection circuit is simple to manufacture and enables mass production easily. Still, it is impossible to sense an ultrafine signal due to a thickness reduction limit of the semiconductor layer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electric field variable gas sensor includes a semiconductor substrate, an insulating film disposed on the semiconductor substrate, a semiconductor thin film material disposed on a part of the semiconductor substrate and a part of the insulating film, a gas molecule adsorption inducing material disposed on the semiconductor thin film material, a first electrode disposed on the semiconductor substrate to be spaced apart from the semiconductor thin film material, and a second electrode disposed on the insulating film to be connected with the semiconductor thin film material.

The semiconductor substrate may be formed of another semiconductor thin film material deposited on any one of quartz, glass, and flexible polymer substrates.

The semiconductor thin film material may include any one of metal oxide-based, silicon-based, and organic materials.

The insulating film may be spaced apart from a part of the second electrode connected to the semiconductor thin film material.

The semiconductor thin film material may include of any one of a semiconductor material with a changeable Fermi level, an oxide semiconductor, and a 2D material.

The insulating film may include an oxide-based insulator material or a 2D material-based insulating film material.

The gas molecule adsorption inducing material may be formed of any one material of metal nanoparticles, oxide nanomaterials, materials mixed with the oxide nanomaterial, and carbon nanotube.

The gas molecule adsorption inducing material may include gas molecule adsorption inducing materials each spaced apart from another.

When gas molecules are adsorbed on the gas molecule adsorption inducing material, a device current of the electric field variable gas sensor may be changed by an energy barrier between the semiconductor substrate and the semiconductor thin film material.

A current amount change of the device current may be exponentially proportional to a Fermi level change between the semiconductor substrate and the semiconductor thin film material.

In another general aspect, a manufacturing method of an electric field variable gas sensor, includes forming a semiconductor substrate, forming an insulating film on the semiconductor substrate, forming a semiconductor thin film material on a part of the semiconductor substrate and a part of the insulating film, forming a gas molecule adsorption inducing material on the semiconductor thin film material, forming a first electrode on the semiconductor substrate to be spaced apart from the semiconductor thin film material, and forming a second electrode on the insulating film to be connected with the semiconductor thin film material.

The forming of the semiconductor substrate may include depositing another semiconductor thin film material on any one of quartz, glass and flexible polymer substrates to form the another semiconductor thin film material as the semiconductor substrate.

The deposited semiconductor thin film material may include any one of metal oxide-based, silicon-based, and organic materials.

The forming of the insulating film may include depositing an insulating film to be spaced apart from a part of the second electrode connected to the semiconductor thin film material.

The forming of the semiconductor thin film may include any one of a semiconductor material with a changeable Fermi level, an oxide semiconductor, and a 2D material.

The forming of the insulating film may include an oxide-based insulator material or a 2D material-based insulating film material.

The forming of the gas molecule adsorption inducing material may include any one material of metal nanoparticles, oxide nanomaterials, materials mixed with the oxide nanomaterial, and carbon nanotube.

The forming of the gas molecule adsorption inducing material may include gas molecule adsorption inducing materials each spaced apart from another.

When gas molecules are adsorbed on the gas molecule adsorption inducing material, a device current of the electric field variable gas sensor may be changed by an energy barrier between the semiconductor substrate and the semiconductor thin film material.

A current amount change of the device current may be exponentially proportional to a Fermi level change between the semiconductor substrate and the semiconductor thin film material.

Other features and aspects will be apparent from the following detailed description, the drawings, and the claims.

BRIEF DESCRIPTION OF DRAWINGS

FIG. 1 depicts a schematic diagram illustrating an electric field variable gas sensor including a gas molecule adsorption inducing material, according to one or more embodiments of the present disclosure.

FIG. 2 depicts a structural diagram illustrating an electric field variable gas sensor including a gas molecule adsorption inducing material, according to one or more embodiments of the present disclosure.

FIG. 3 depicts a flowchart of a manufacturing method of an electric field variable gas sensor including a gas molecule adsorption inducing material, according to one or more embodiments of the present disclosure.

FIGS. 4 to 8 are process flowcharts illustrating a manufacturing method of an electric field variable gas sensor including a gas molecule adsorption inducing material, according to one or more embodiments of the present disclosure.

FIGS. 9 and 10 are diagrams illustrating an operational principle of an electric field variable gas sensor according to an electric field by a gas molecule adsorption inducing material, according to one or more embodiments of the present disclosure.

FIG. 11 is a diagram illustrating an example of current change measurement using one or more embodiments of the present disclosure.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIGS. 1 to 2 depict a schematic diagram and a structural diagram of an electric field variable gas sensor including a gas molecule adsorption inducing material, respectively, according to one or more embodiments of the present disclosure.

As illustrated in FIGS. 1 and 2, an electric field variable gas sensor 100 including a gas molecule adsorption inducing material, according to one or more embodiments of the present disclosure, includes a semiconductor substrate 110, an insulating film 120, a semiconductor thin film material 130, a gas molecule adsorption inducing material 140, a first electrode 150, and a second electrode 160. However, all illustrated components are not required. More components than the illustrated components may also implement the electric field variable gas sensor 100. The electric field variable gas sensor 100 may be implemented even by fewer components than the illustrated components.

The electric field variable gas sensor 100, according to one or more embodiments of the present disclosure, may enhance the sensitivity of the sensor by efficiently changing a device current based on an energy barrier between the semiconductor substrate 110 and the semiconductor thin film material 130 by an electric field of gas molecules adsorbed on the gas molecule adsorption inducing material 140 of the top layer. One or more embodiments of the present disclosure relates to the electric field variable gas sensor 100 for ultra-small size, ultra-high sensitivity, and superpower.

Hereinafter, detailed configurations and operations of the components of the electric field variable gas sensor 100, including the gas molecule adsorption inducing material 140 of FIGS. 1 and 2 will be described.

For example, the lower semiconductor substrate 110 may use a semiconductor silicon substrate. In addition, the semiconductor substrate 110 may be formed of another semiconductor thin film material deposited on any one of quartz, glass, and flexible polymer substrates. The semiconductor substrate 110 may be replaced by the deposition of another semiconductor thin film material on the quartz, glass, or flexible polymer substrate. Another semiconductor thin-film material to be deposited may include metal oxide-based (e.g., ZnO, VaOx, NiOx, etc.), silicon-based, organic materials (e.g., IGZO, IZO, etc.), or the like.

The insulating film 120 is formed on a part of the semiconductor substrate 110. The insulating film 120 may be deposited as an insulating film on which a part of the second electrode 160 and a part of the semiconductor thin film material 130 are disposed. The insulating film 120 may be formed of an insulating film consisting of an oxide-based insulator material (e.g., $SiO_2$, $Al_2O_3$, $HfO_2$, etc.) or a 2D material-based insulating film material.

A part of the semiconductor thin film material 130 is deposited to heterogeneously bond with an upper surface portion of the semiconductor substrate 110. Another part of the semiconductor thin film material 130 is formed on and to connect to a part of the insulating film 120. The deposited semiconductor thin film material 130 may include any one material of metal oxide-based, silicon-based, and organic materials. In addition, the semiconductor thin film material 130 may be formed of a semiconductor thin film material consisting of any one of a semiconductor material (including Si, etc.) with a changeable Fermi level, oxide semiconductors, and 2D materials.

The gas molecule adsorption inducing material 140 is formed on the semiconductor thin film material 130. The gas molecule adsorption inducing material 140 is applied and adsorbed on the upper semiconductor thin film material 130. The gas molecule adsorption inducing material 140 may be formed of a gas molecule adsorption inducing material consisting of any one material of metal nanoparticles, oxide nanomaterials, materials mixed with the oxide nanomaterial, and carbon nanotube. The gas molecule adsorption inducing material 140 may be formed of a plurality of gas molecule adsorption inducing materials spaced apart from each other on the semiconductor thin film material 130. The gas molecule adsorption inducing material 140 may include any one material of metal nanoparticles (e.g., Au, Ag, Pt, etc.), oxide nanomaterials (e.g., N-type: $SnO_2$, ZnO, $In_2O_3$, $TiO_2$, $Fe_2O_3$, P-type: $Co_3O_4$, CuO, NiO, etc.), materials mixed with the oxide nanomaterial (e.g., NiO/ZnO, $SNO_2$/CuO, $In_2O_3$/$TiO_2$, and $Vo_2$/ZnO), and carbon nanotube.

Metals for the first electrode 150 for the semiconductor substrate 110 and the second electrode 160 for the upper semiconductor thin film material 130 are deposited. The first electrode 150 is formed on the semiconductor substrate 110 to be spaced apart from the semiconductor thin film material 130. The second electrode 160 is formed on the insulating film 120 to be connected with the semiconductor thin film material 130. The first electrode 150 and the second electrode 160 may include metals (e.g., Au, Ti, Ni, Pt, Al, etc.) used in the electrodes.

When the gas molecules are adsorbed on the gas molecule adsorption inducing material 140, a device current may be changed by the energy barrier between the semiconductor substrate 110 and the semiconductor thin film material 130. A current amount change of the device current may be exponentially proportional to a Fermi level change between the semiconductor substrate 110 and the semiconductor thin film material 130.

All deposition processes may include patterning and deposition through a photolithography process and an E-beam deposition process.

FIG. 3 depicts a flowchart of a manufacturing method of an electric field variable gas sensor including a gas molecule adsorption inducing material.

FIGS. 4 to 8 depict process flowcharts illustrating a manufacturing method of an electric field variable gas sensor including a gas molecule adsorption inducing material according to one or more embodiments of the present disclosure.

In operation S101, in a manufacturing method of the electric field variable gas sensor 100, the semiconductor substrate 110 is formed. The process for operation S101 of forming the semiconductor substrate 110 is illustrated in FIG. 4.

In operation S102, in the manufacturing method of the electric field variable gas sensor 100, the insulating film 120 is formed on the semiconductor substrate 110. The process for operation S102 of forming the insulating film 120 on the semiconductor substrate 110 is illustrated in FIG. 5.

In operation S103, in the manufacturing method of the electric field variable gas sensor 100, the semiconductor thin film material 130 is formed to be heterogeneously bonded with a part of the semiconductor substrate 110 and connected with a part of the insulating film 120. The process for operation S103 of forming the semiconductor thin film material 130 is illustrated in FIG. 6.

In operation S104, in the manufacturing method of the electric field variable gas sensor 100, the gas molecule adsorption inducing material 140 is formed on the semiconductor thin film material 130. The process for operation S104 of forming the gas molecule adsorption inducing material 140 is illustrated in FIG. 7.

In operation S105, in the manufacturing method of the electric field variable gas sensor 100, the first electrode 150 is formed on the semiconductor substrate 110 to be spaced apart from the semiconductor thin film material 130.

In operation S106, in the manufacturing method of the electric field variable gas sensor 100, the second electrode 160 is formed on the insulating film 120 to be connected with the semiconductor thin film material 130. The process for operations S105 and S106 of forming the first electrode 150 and the second electrode 160 is illustrated in FIG. 8.

FIGS. 9 and 10 are diagrams illustrating an operational principle of an electric field variable gas sensor according to an electric field by a gas molecule adsorption inducing material according to one or more embodiments of the present disclosure.

An electron mobility method and an energy barrier change of the electric field variable gas sensor 100 will be analyzed.

FIG. 9 shows a band diagram before gas adsorption, and FIG. 10 shows a band diagram after gas adsorption. After gas adsorption, a change in the Fermi level of the semiconductor thin film material 130 is caused by electric field application by the gas molecule adsorption inducing material 140 to reduce the energy barrier and exhibit a sensing current result.

The Fermi level during non-adsorption of gas molecules is shown as a first solid line 901 illustrated in FIG. 9. Before the adsorption of gas molecules, the Fermi level is located in the middle of the semiconductor substrate 110 and the semiconductor thin film material 130 to form a high energy barrier. In the case of existing gas molecule adsorption inducing materials, the number of electrons passing through the high electric field energy barrier is reduced, and the current amount is reduced in the semiconductor thin film material due to a slight electric field effect.

The Fermi level during adsorption of gas molecules is shown as a second solid line 902 illustrated in FIG. 10. The gas is selectively adsorbed to a gas adsorption material, thereby changing the electric field in the gas molecule adsorption inducing material. The electric field of the gas molecule adsorption inducing material 140 is applied to the bonded semiconductor thin film material. By the applied electric field, a carrier of the semiconductor thin film material is changed so that the Fermi level moves to a conduction band. Accordingly, the energy barrier between the semiconductor substrate 110 and the semiconductor thin film material 130 is lowered. As a result, the number of electrons passing through the barrier increases, and the amount of current increases.

As described above, halls are accumulated in the semiconductor thin film material 130, and the Fermi level moves to a balance band, and as a result, a Schottky barrier is increased. As a result, the number of electrons passing through the high Schottky barrier is reduced, and thus, the amount of current is reduced.

Electrons are accumulated in the semiconductor thin film material 130, and the Fermi level moves to a conduction band, and as a result, the Schottky barrier is decreased. The number of electrons passing through the low Schottky barrier increases, and thus, the amount of current increases.

A current amount change of a conventional resistive gas sensor is proportional to the square ($\Delta J \propto \Delta E_f^2$) of a Fermi level change of the semiconductor thin film material 130. Meanwhile, in the electric field variable gas sensor 100 including the gas molecule adsorption inducing material 140, the semiconductor thin film material 130, and the semiconductor substrate 110 according to an embodiment of the present disclosure, the current amount change is exponentially ($\Delta J \propto e^{\Delta \Phi}$) proportional to the Fermi level change. Thus, the current amount is exponentially changed by the energy carrier. As a result, when $\Delta E_f = 0.01$ to $0.1$ eV, the sensitivity may be improved 100 to 10,000 times. In addition, the operating power may be reduced 1,000 times.

According to one or more embodiments of the present disclosure, it is possible to analyze an electron mobility method by gas adsorption through current analysis of the gas sensor and improve the performance of the electric field variable gas sensor 100. The movement of the Fermi level of the thin film by the adsorption gas will also affect the size of the Schottky Barrier. A semiconductor material suitable for each gas may be selected by analyzing the size (slope of $\ln(I_{sat}/T^2)$ vs $e/(K_B T))$ of the Schottky barrier according to a type of semiconductor material through low-temperature measurement.

In one or more embodiments of the present disclosure, it is possible to provide a supersensitive gas sensor with improved sensitivity 100 times or more than conventional gas sensors using the electric field variable gas sensor with supersensitivity and ultra-low power, including the gas molecule adsorption inducing material 140.

FIG. 11 is a diagram illustrating an example of current change measurement using one or more embodiments of the present disclosure.

As illustrated in FIG. 11, a target gas material is injected into the electric field variable gas sensor 100 according to one or more embodiments of the present disclosure to measure a time source/drain current in real time. Thus, the measurement of the electric field variable gas sensor 100 and selectivity of gases by various nanoparticles can be confirmed in various gas environments.

As the demand for portable gas sensors increases, the demand for ultra-small and low-power sensors also rapidly increases. The portable gas sensor may be used at a safe distance, and has an advantage of relatively small installation cost and size. Conventional gas sensors enable only limited services due to a relatively large power consumption and size. Existing ubiquitous sensor nodes mainly pertain to temperature/humidity sensors with low power consumption and are limited in service range. However, the measurement of the electric field variable gas sensor 100 of the subject disclosure allows for more functions to be available.

According to the embodiments of the present disclosure, it is possible to provide a supersensitive gas sensor using nanotechnology by testing detection of trace gas used for a respiratory disease sensor, a food safety diagnosis sensor, a toxic gas sensor, and the like. According to the embodiments of the present disclosure, it is possible to provide a supersensitive gas sensor capable of detecting trace gas of ppb or ppt level other than ppm level which is the typical limit of conventional gas sensors because specific gas corresponding to a biomarker is the trace amount level.

In one or more embodiments of the present disclosure, various embodiments described above may be implemented with software, including instructions stored in machine (e.g., computer)-readable storage media. The machine may include an electronic device (e.g., electronic device A) according to the disclosed embodiments, as a device which calls instructions stored in the storage media and is operable according to called instructions. When the instructions are executed by a processor, the processor may perform functions corresponding to the instructions using other components directly or under a control of the processor. The instructions may include codes generated or executed by a compiler or an interpreter. The machine-readable storage media may be provided in the form of non-transitory storage media. Here, 'non-transitory' means that the storage medium does not include a signal and is tangible, but is not distinguished with that data is semi-permanently or temporarily stored on the storage medium.

Further, according to one or more embodiments of the present disclosure, the methods according to the various embodiments described above may be included in a computer program product. The computer program product may be traded between sellers and buyers as goods. The computer program product may be distributed in the form of a machine-readable storage medium (e.g., compact disc read only memory (CD-ROM)) or online through an application store (e.g., Playstore™). In the online distribution, at least some of the computer program products may be at least transitorily stored or temporarily generated in storage media such as a memory of a server of a manufacturer, a server of an application store, or a relay server.

Further, according to one or more embodiments of the present disclosure, the various embodiments described above may be implemented in recording media which are readable by a computer or a similar device thereto using software, hardware, or a combination thereof. In some cases, the embodiments described in the specification may be implemented by the processor itself. According to software implementation, embodiments such as procedures and functions described in the specification may be implemented by separate software modules. Each of the software modules may perform one or more functions and operations described in this specification.

Meanwhile, computer instructions for performing processing operations of the machine according to the various embodiments described above may be stored in a non-transitory computer-readable medium. When the computer instructions stored in the non-transitory computer-readable medium are executed by a processor of a specific machine, the specific machine performs processing operations in the machine according to the various embodiments described above. The non-transitory computer-readable medium is not a medium that stores data therein for a while, such as a register, a cache, or a memory, but means a medium that semi-permanently stores data therein and is readable by the machine. Specific examples of the non-transitory computer-readable medium may include a CD, a DVD, a hard disk, a Blu-ray disk, a USB, a memory card, a ROM, and the like.

Further, components (e.g., modules or programs) according to the various embodiments described above may be configured in a single object or a plurality of objects, respectively, and some subcomponents of the corresponding subcomponents described above will be omitted or other subcomponents may be further included in various embodiments. Alternatively or additionally, some components (e.g., modules or programs) may be integrated into one object to equally or similarly perform functions performed by each corresponding component before being integrated. According to various embodiments, operations to be performed by modules, programs or other components may be sequentially, in parallel, repetitively, or heuristically performed, or at least some of operations may be executed in different orders or omitted, or other operations may be added.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electric field variable gas sensor comprising:
a semiconductor substrate;
an insulating film disposed on the semiconductor substrate;
a semiconductor thin film material disposed directly on a part of the semiconductor substrate and a part of the insulating film;
a gas molecule adsorption inducing material disposed on the semiconductor thin film material;
a first electrode disposed on the semiconductor substrate to be spaced apart from the semiconductor thin film material; and
a second electrode disposed on the insulating film to be connected with the semiconductor thin film material.

2. The electric field variable gas sensor of claim 1, wherein the semiconductor substrate is formed of another semiconductor thin film material deposited on any one of quartz, glass, and flexible polymer substrates.

3. The electric field variable gas sensor of claim 2, wherein the semiconductor thin film material includes any one of metal oxide-based, silicon-based, and organic materials.

4. The electric field variable gas sensor of claim 1, wherein the insulating film is spaced apart from a part of the second electrode connected to the semiconductor thin film material.

5. The electric field variable gas sensor of claim 1, wherein the semiconductor thin film material comprises of any one of a semiconductor material with a changeable Fermi level, an oxide semiconductor, and a 2D material.

6. The electric field variable gas sensor of claim 1, wherein the insulating film comprises an oxide-based insulator material or a 2D material-based insulating film material.

7. The electric field variable gas sensor of claim 1, wherein the gas molecule adsorption inducing material is formed of any one material of metal nanoparticles, oxide nanomaterials, materials mixed with the oxide nanomaterial, and carbon nanotube.

8. The electric field variable gas sensor of claim 1, wherein the gas molecule adsorption inducing material comprises gas molecule adsorption inducing materials each spaced apart from another.

9. The electric field variable gas sensor of claim 1, wherein when gas molecules are adsorbed on the gas molecule adsorption inducing material, a device current of the electric field variable gas sensor is changed by an energy barrier between the semiconductor substrate and the semiconductor thin film material.

10. The electric field variable gas sensor of claim 9, wherein a current amount change of the device current is exponentially proportional to a Fermi level change between the semiconductor substrate and the semiconductor thin film material.

11. A manufacturing method of an electric field variable gas sensor, the manufacturing method comprising:
forming a semiconductor substrate;
forming an insulating film on the semiconductor substrate;
forming a semiconductor thin film material directly on a part of the semiconductor substrate and a part of the insulating film;
forming a gas molecule adsorption inducing material on the semiconductor thin film material;
forming a first electrode on the semiconductor substrate to be spaced apart from the semiconductor thin film material; and
forming a second electrode on the insulating film to be connected with the semiconductor thin film material.

12. The manufacturing method of claim 11, wherein the forming of the semiconductor substrate comprises depositing another semiconductor thin film material on any one of quartz, glass and flexible polymer substrates to form the another semiconductor thin film material as the semiconductor substrate.

13. The manufacturing method of claim 12, wherein the deposited semiconductor thin film material includes any one of metal oxide-based, silicon-based, and organic materials.

14. The manufacturing method of claim 11, wherein the forming of the insulating film comprises depositing an insulating film to be spaced apart from a part of the second electrode connected to the semiconductor thin film material.

15. The manufacturing method of claim 11, wherein the forming of the semiconductor thin film comprises any one of a semiconductor material with a changeable Fermi level, an oxide semiconductor, and a 2D material.

16. The manufacturing method of claim 11, wherein the forming of the insulating film comprises an oxide-based insulator material or a 2D material-based insulating film material.

17. The manufacturing method of claim 11, wherein the forming of the gas molecule adsorption inducing material comprises any one material of metal nanoparticles, oxide nanomaterials, materials mixed with the oxide nanomaterial, and carbon nanotube.

18. The manufacturing method of claim 11, wherein the forming of the gas molecule adsorption inducing material comprises gas molecule adsorption inducing materials each spaced apart from another.

19. The manufacturing method of claim 11, wherein when gas molecules are adsorbed on the gas molecule adsorption inducing material, a device current of the electric field variable gas sensor is changed by an energy barrier between the semiconductor substrate and the semiconductor thin film material.

20. The manufacturing method of claim 19, wherein a current amount change of the device current is exponentially proportional to a Fermi level change between the semiconductor substrate and the semiconductor thin film material.

* * * * *